(12) United States Patent
Cowley et al.

(10) Patent No.: US 8,300,731 B2
(45) Date of Patent: Oct. 30, 2012

(54) METHODS AND SYSTEMS TO DIGITALLY SWITCH BETWEEN FREQUENCIES AND CORRESPONDING BANDWIDTHS IN A TRANSCEIVER

(75) Inventors: Nicholas Cowley, Wiltshire (GB); Kennan Herbert Laudel, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 554 days.

(21) Appl. No.: 12/565,306

(22) Filed: Sep. 23, 2009

(65) Prior Publication Data

US 2011/0069740 A1    Mar. 24, 2011

(51) Int. Cl.
*H04L 27/00* (2006.01)

(52) U.S. Cl. .................................................. 375/316

(58) Field of Classification Search ............... 375/316, 375/130, 136, 147, 346, 350; 455/74, 307, 455/310; 370/338, 323, 313
See application file for complete search history.

(56) References Cited

U.S. PATENT DOCUMENTS 6,678,340 B1 * 1/2004 Khlat et al. ............... 375/350
7,957,480 B2 * 6/2011 Egashira et al. .......... 375/260

* cited by examiner

*Primary Examiner* — Khai Tran
(74) *Attorney, Agent, or Firm* — Garrett IP, LLC

(57) ABSTRACT

Methods and systems to maintain a tuner at a fixed frequency and to switch between frequencies and bandwidths in a digital domain. IQ imbalance equalization coefficients may be determined with respect to a frequency and bandwidth of a first signal, and the coefficients may be applied to baseband data associated with one or more other frequencies and/or bandwidths. Methods and systems disclosed herein may be applied in a multi-mode Multimedia over Coax Alliance (MoCA) environment, such as to digitally switch between a MoCA 2 standard and a MoCA 1.x standard.

10 Claims, 4 Drawing Sheets

Receive Path

Transmit Path

METHODS AND SYSTEMS TO DIGITALLY SWITCH BETWEEN FREQUENCIES AND CORRESPONDING BANDWIDTHS IN A TRANSCEIVER

BACKGROUND

Channel switching or hopping may be performed in an analog domain at a transmitter or receiver front-end, such as by re-tuning a local oscillator and channel bandwidth parameters. This may, however, involve relatively complex and expensive technical requirements. For example, front-end switching may require a local oscillator/phase-locked-loop (PLL) that is capable of relatively fast tuning, such as on an order of micro-seconds, and may require channel filters that are capable of relatively fast adjustment between different bandwidths. Where front-end self-calibration is implemented, such as to compensate for systemic quadrature imbalance errors between in-phase and quadrature phase (I/Q) signal paths, separate self-calibration mechanisms may be required for each bandwidth. Front-end switching may also require mechanisms to ensure that filters return to conditions applied during calibration.

BRIEF DESCRIPTION OF THE DRAWINGS/FIGURES

Figure 1:
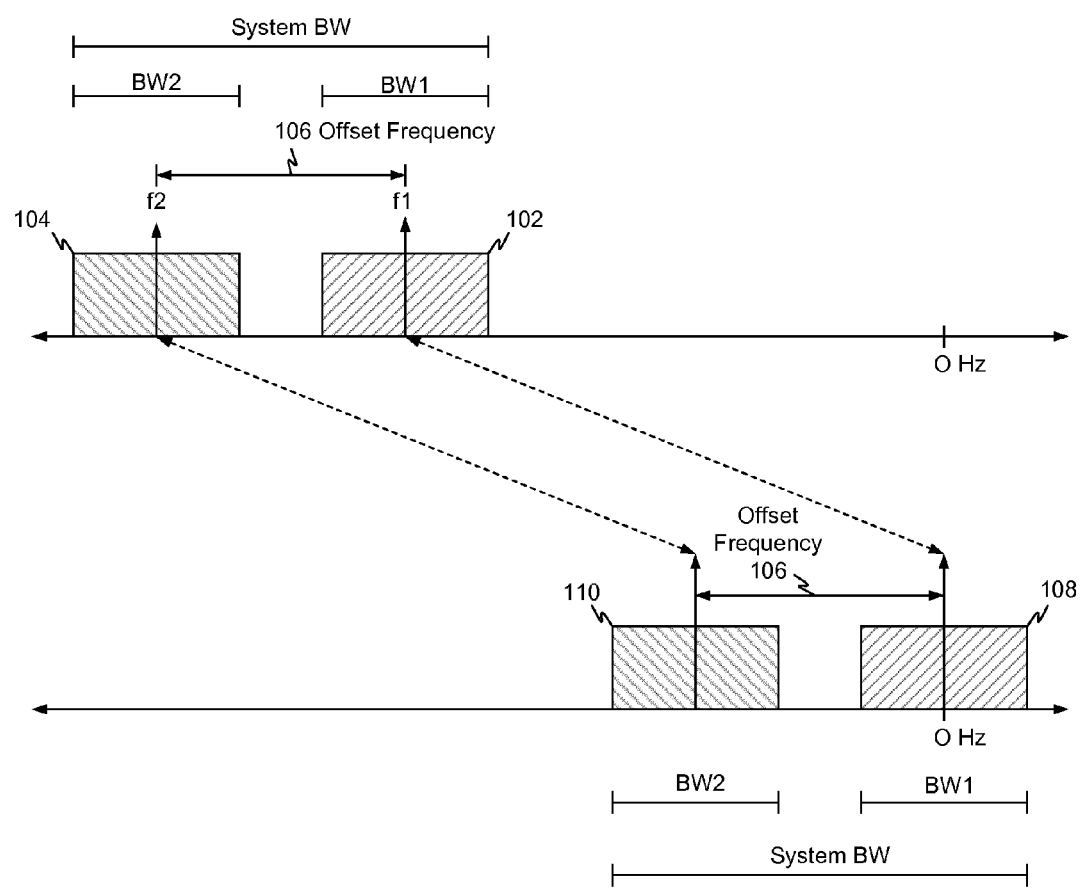
FIG. 1 is a graphic depiction of an exemplary environment to switch between a first frequency F1 and a second frequency F2 in a digital domain.

In the drawings, the leftmost digit(s) of a reference number identifies the drawing in which the reference number first appears.

DETAILED DESCRIPTION

Disclosed herein are methods and systems to switch between frequencies and bandwidths in a digital domain.

FIG. 1 is a graphic depiction of an exemplary environment 100 to switch between a first frequency F1 and a second frequency F2. Environment 100 may correspond to one or more of a receive environment and a transmit environment.

FIG. 1 includes first and second modulated signals 102 and 104, each having corresponding center frequencies F1 and F2, and corresponding bandwidths BW1 and BW2. Center frequencies F1 and F2 are separated from one another by an offset frequency 106.

Signals 102 and 104 may include orthogonal frequency division multiplex (OFDM) signals.

Signals 102 and 104 may correspond to one or more Multimedia over Coax Alliance (MoCA) standards as promulgated and/or proposed by the MoCA at http://www.mocalliance.org/, such as to facilitate home networking on coaxial cable, which may operate in a 1 GHz microwave band, and which may include OFDM modulation.

In a receive environment, signals 102 and 104 may be received at a frequency converter that is tuned to frequency F1, and calibrated for a bandwidth BW that encompasses bandwidth BW1 of signal 102 and bandwidth BW2 of signal 104.

Signals 102 and 104 may be frequency down-converted in an analog domain to generate baseband components 108 of signal 102, and to generate an image of signal 104 at offset frequency 106, illustrated in FIG. 1 as intermediate frequency (IF) modulated signal 110.

Baseband components 108 and IF signal 110 may be digitized and processed in the digital domain. Digitized IF signal 110 may be demodulated to corresponding baseband components in the digital domain.

The receiver may effectively operate as a single channel receiver when signal 102 is received. When signal 104 is received, channel switching may be performed dynamically in the digital domain, which may be faster than channel switching in an analog domain.

Frequency down-conversion may be performed with a zero-intermediate frequency (ZIF) converter, also referred to herein as a direct down-converter and a single-stage frequency down-converter. Frequency down-conversion may include mixing signals 102 and 104 with a reference signal having frequency F1, and filtering undesired images. Filtering may be performed at baseband. Alternatively, frequency down-conversion may be performed with a heterodyne or super-heterodyne frequency down-conversion system.

IQ imbalances may arise in the frequency conversion and/or filtering processes. IQ imbalance compensation may be determined from baseband data and compensated in the digital domain. IQ imbalance compensation may be determined and compensated relative to frequency F1 and bandwidth BW of the receive tuner, and the same compensation may be applied to digitized baseband components of signals 102 and 104.

Signals at a plurality of frequencies may thus be received at a tuner that is tuned to one of the frequencies, and calibrated to a bandwidth that encompasses bandwidths of the plurality of signals. Switching amongst the signals may be performed in the digital domain.

In a transmit environment, baseband components of signal 102 may be digitally modulated as baseband components 108 and frequency up-converted to frequency F1 as signal 102.

Baseband components of signal 104 may be digitally modulated to offset frequency 106 as IF signal 110 and frequency up-converted to frequency F2 as signal 104.

Frequency up-conversion may be performed with a ZIF converter. Frequency up-conversion may include mixing each of signals 108 and 110 with a carrier signal having frequency F1 and filtering undesired images. Alternatively, frequency up-conversion may be performed with a heterodyne or super-heterodyne frequency up-conversion system.

IQ imbalances may arise in the frequency conversion and/or filtering processes. Baseband components of signals 102 and 104 may be pre-compensated for IQ imbalances in the digital domain prior to up-conversion. IQ imbalance pre-compensation may be determined and compensated relative to frequency F1 and bandwidth BW of the transmit tuner, and the same compensation may be applied to baseband components of signals 102 and 104

Signals at a plurality of frequencies may thus be transmitted from a tuner that is tuned to one of the frequencies and calibrated with respect to a bandwidth that encompasses bandwidths of the plurality of signals. Switching amongst the signals may be performed in the digital domain.

The transmitter may effectively operate as a single channel receiver when baseband components are to be transmitted at frequency F1. When baseband components are to be transmitted at frequency F2, channel switching may be performed dynamically in the digital domain, which may be faster than channel switching in an analog domain. Channel switching may be performed subsequent to a digital-to-analog conversion of the baseband components.

Signals 102 and 104 may be modulated in accordance with a single-side-band (SSB) modulation technique.

System bandwidth BW may be substantially equal to bandwidth BW1, which may be greater than bandwidth BW2, and bandwidth BW2 may be greater than offset frequency 106. Bandwidth BW1 may be approximately equal to two times bandwidth BW2, and bandwidth BW2 may be approximately equal to two times offset frequency 106.

Figure 2:
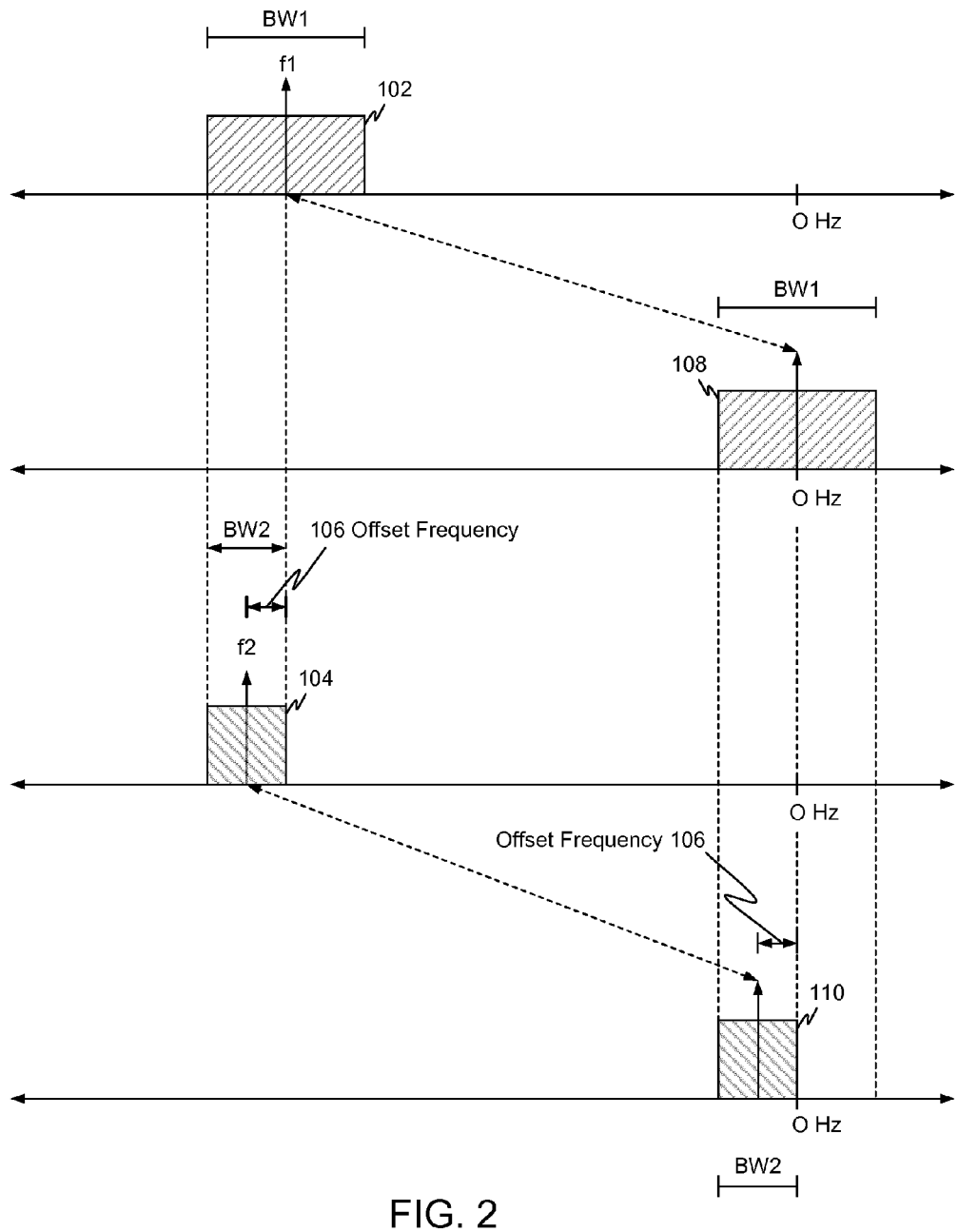
FIG. 2 is a graphic depiction of another exemplary environment to switch between first frequency F1 and second frequency F2 in a digital domain.

FIG. 2 is a graphic depiction of an exemplary environment 200, wherein bandwidth BW1 of signal 102 is approximately equal to two times bandwidth BW2 of signal 104, and bandwidth BW2 is approximately equal to two times offset frequency 106. Environment 200 may correspond to a MoCA environment.

In FIG. 2, signals 102 and 104 may correspond to different MoCA standards. For example, a MoCA 1.0 standard, ratified in 2007, specifies a channel bandwidth of 50 MHz between approximately 875 MHz and 1500 MHz. A proposed MoCA standard, referred to herein as MoCA 2.0, specifies a channel bandwidth of 100 MHz between approximately 1125 MHz and 1675 MHz. The channel frequency grid of a MoCA 1.0 signal may be offset from the channel frequency grid of a MoCA 2.0 signal by 25 MHz.

In the example of FIG. 2, signal 102 may correspond to MoCA 2.0, and signal 104 may correspond to MoCA 1.0, and frequencies F1 and F2 may be within a range of approximately 875 MHz and 1675 MHz.

A MoCA standard may call for interoperability with earlier standards. A MoCA standard may specify that, where nodes of different MoCA standards co-exist, a MoCA 1.0 channel carrier frequency shall be offset from a MoCA 2.0 carrier frequency by 25 MHz. In FIG. 2, offset frequency 106 may be 25 MHz.

MoCA nodes may transmit and receive to each other on a simplex packet by packet basis, whereby a transmitting node may send a first packet to a first node, a second packet to a second node, and a third packet to a third note. When transmitting to, or receiving from nodes associated with different MoCA standards, consecutive packets may correspond to different MoCA standards.

Interoperability between MoCA standards may require relatively fast channel switching or hopping between packets associated with different standards. Channel hopping may include changes in channel bandwidth in addition to changes in frequency.

As disclosed herein, channel hopping or switching between packets of different standards may be selectively performed at least in part in a digital domain.

Figure 3:
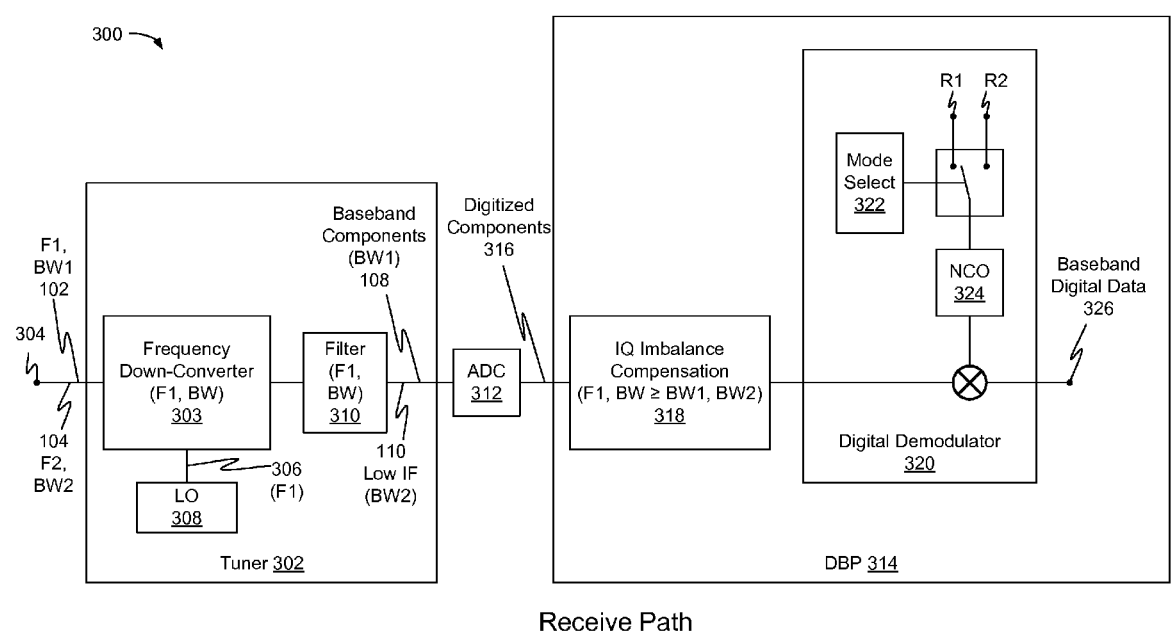
FIG. 3 is a block diagram of an exemplary receiver to digitally switch between frequencies and bandwidths.

FIG. 3 is a block diagram of an exemplary receiver 300. Receiver 300 is described below with reference to environment 200 of FIG. 2. Environment 200 is not, however, limited to the example of FIG. 3.

Receiver 300 includes a tuner 302 to down-convert signals received at a node 304, such as signals 102 and 104 in FIG. 2. Node 304 may correspond to one or more of a coaxial cable and an antenna.

Tuner 302 may include a frequency down-converter 303 tuned to a reference frequency 306, which may correspond to frequency F1 in FIG. 2. Tuner 302 may include a local oscillator (LO) 308 to generate reference frequency 306.

Where LO 308 generates reference signal 306 at frequency F1, tuner 302 may down-convert signal 102 to baseband components 108, and may down-convert signal 104 to relatively low IF signal 110, as illustrated in FIG. 2. IF signal 110 may include I and Q components.

Tuner 302 may include a baseband filter 310, which may include I and Q path filters to filter undesired images that fall outside of bandwidth BW.

Receiver 300 may include an analog-to-digital converter (ADC) 312 to digitize filtered baseband components 108 and IF signal 110, and to output corresponding digitized components 316.

Receiver 300 may include a digital baseband processor (DBP) 314 to process digitized components 316 in a digital domain.

DBP 314 may include a digital demodulator 320 to demodulate baseband digital data 326 from digitized components 316.

Digital demodulator 320 may be controllable to operate at one of a plurality of digitally selectable frequencies. For example, digital demodulator 320 may include mode selector 322 to selectively operate digital demodulator 320 with respect to first and second reference frequencies R1 and R2. Where receiver 300 is implemented to receive signals 102 and 104 of FIG. 2, reference frequency R1 may be set to zero Hz to cause demodulator 320 to demodulate data within a bandwidth centered about zero Hz. Reference frequency R2 may be set to a relatively low frequency to cause demodulator 320 to demodulate data within the bandwidth centered about the relatively low frequency of IF signal 110.

When digitized components 316 correspond to zero-IF baseband components 108 of FIG. 2, mode selector 322 may apply reference frequency R1 to a local oscillator (LO) 324. When digitized components 316 correspond to IF signal 110 of FIG. 2, mode selector 322 may apply reference frequency R2 to LO 324.

LO 324 May Include a Non-Coherent Oscillator.

Digital demodulator 320, or portions thereof, may be implemented with a direct digital synthesis (DSS) module.

DBP 314 may include an IQ compensation module, illustrated here as a digital baseband IQ compensation module 318, to compensate IQ imbalances that arise in tuner 302. Compensation module 318 may include logic to compensate one or more of frequency dependent and frequency independent IQ phase and amplitude gain imbalances.

Compensation module 318 may be configured to determine IQ imbalance compensation in the digital domain from one or more of digitized components 316 and baseband digital data 326.

Compensation module 318 may be configured to apply IQ imbalance compensation at baseband to one or more of baseband components 108, IF signal 110, digitized components 316, and baseband digital data 326.

Compensation module 318 may be calibrated with respect to reference frequency 306 and bandwidth BW, and to apply the compensation to corresponding components of signals 102 and 104.

DBP 314 may include one or more additional modules to process baseband digital data 326.

In a multi-mode environment, such as a multi-mode MoCA environment, when signal 102 is received, which may correspond to a MoCA 2.0 signal, DBP 314 may operate in a first conversion mode, referred to herein as a MoCA 2.0 mode, in which mode selector 322 operates digital demodulator 320 with respect to reference frequency R1.

When signal 104 is received, which may correspond to a MoCA 1.0 signal, DBP 314 may operate in a second conversion mode, referred to herein as a dual conversion or MoCA 1.0 mode, in which mode selector 322 operates digital demodulator 320 with respect to reference frequency R2.

During both MoCA 1.0 and MoCA 2.0 modes, tuner 302 and compensation module 318 may remain tuned with respect to MoCA 2.0 mode.

Figure 4:
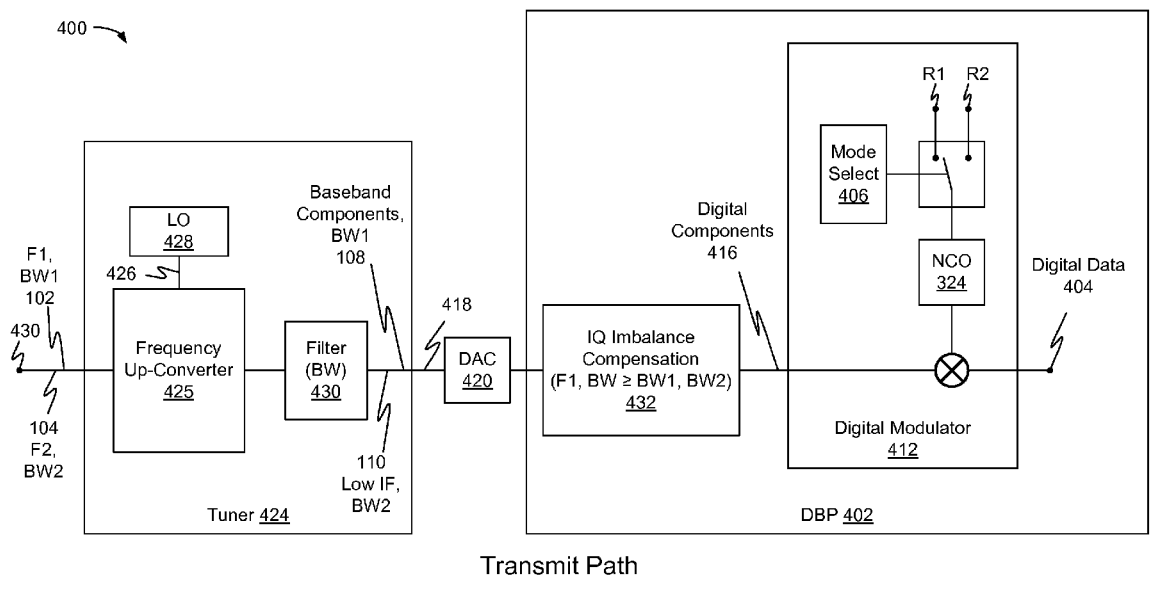
FIG. 4 is a block diagram of an exemplary transceiver to digitally switch between frequencies and bandwidths.

FIG. 4 is a block diagram of an exemplary transmitter 400. Transmitter 400 is described below with reference to environment 200 of FIG. 2. Environment 200 is not, however, limited to the example of FIG. 4.

Transmitter 400 includes a digital baseband processor 402 to process digital data 404.

DBP 402 may include a digital modulator 412 to generate digital baseband components 416 from data 404.

Digital modulator 412 may be digitally controllable to modulate digital data 404 with respect to a plurality of selectable frequencies or channels. For example, digital modulator 412 may include a mode selector 406 to selectively operate digital modulator 412 with respect to first and second reference frequencies R1 and R2. Where transmitter 400 is implemented to transmit signals 102 and 104 of FIG. 2, reference frequency R1 may be set to zero Hz to cause modulator 412 to modulate data 404 within a bandwidth centered about zero Hz, and reference frequency R2 may be set to a relatively low frequency to cause modulator 412 to modulate data 404 within a bandwidth centered about the frequency of IF signal 110.

Digital modulator 412, or portions thereof, may be implemented with a direct digital synthesis (DSS) module.

DBP 402 may include one or more additional modules to process one or more of data 404 and digital baseband components 416.

Transmitter 400 includes a digital-to-analog converter (DAC) 420 to convert digital baseband components 416 to analog baseband components 418, which may correspond to one or more of baseband components 108 and IF signal 110 in FIG. 2.

Transmitter 400 includes a tuner 424, which may include a frequency up-converter 425 to frequency up-convert analog baseband components 418 with respect to a reference frequency 426, which may correspond to frequency F1 in FIG. 2. Tuner 424 may include a local oscillator (LO) 428 to generate reference frequency 426.

Tuner 424 may be configured as a ZIF tuner, and may be configured to perform single-sideband (SSB) up-conversion, at least with respect to signal 104.

Tuner 424 may include a baseband filter 430, which may include I and Q path filters to filter undesired images that fall outside of bandwidth BW.

DBP 402 may include a digital IQ compensation module 432 to pre-compensate IQ imbalances associated with tuner 424. Compensation module 318 may include logic to compensate one or more of frequency dependent and frequency independent IQ phase and amplitude gain imbalances.

Compensation module 432 may be configured to determine IQ imbalance compensation in a digital domain, such as by receiving outputs of filter 430 and outputs of frequency up-converter 425 at a calibrated receiver, and determining compensation parameters from corresponding received digital components.

Compensation module 432 may be configured to apply the IQ imbalance compensation at baseband to one or more of data 404, digital baseband components 416, and analog baseband components 418.

Compensation module 432 may be calibrated respect to reference frequency 426 and bandwidth BW, and to apply the compensation to corresponding components of signals 102 and 104.

In a multi-mode environment, such as a multi-mode MoCA environment, when data 404 is to be transmitted in accordance with MoCA 2.0, DBP 402 may operate in a first conversion mode, or a MoCA 2.0 mode, in which digital modulator 412 is controlled to modulate data 404 to digital IQ, zero IF components that occupy a frequency bandwidth between −50 and 50 MHz, in response to reference frequency R1.

When data 404 is to be transmitted in accordance with MoCA 1.0, DBP 402 may operate in a second conversion mode, referred to herein as a dual conversion or MoCA 1.0 mode, in which digital modulator 412 is controlled to modulate data 404 to digital IF components centered at 25 MHz and having a bandwidth of 0 to 50 MHz, in response to reference frequency R2.

During both MoCA 1.0 and MoCA 2.0 modes, tuner 424 and filter 430 and compensation module 432 may remain tuned with respect to MoCA 2.0 mode.

As disclosed herein, channel hopping may be performed without switching or re-tuning a local oscillator. Channel hopping may thus be performed, such as on a packet by packet basis, without relatively complex phase locked loop (PLL) and voltage controlled oscillator combinations, and without switching filter bandwidths.

A common set of IQ imbalance equalization coefficients may be determined with respect to a frequency and bandwidth of a first signal, and the coefficients may be utilized with respect to signals having one or more other frequencies and/or bandwidths. For example, IQ imbalance equalization coefficients may be determined in MoCA 2.0 mode with respect to a MoCA 2.0 baseband filter and LO frequency.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:
1. A system, comprising:
a receive tuner, tuned with respect to a first frequency, to down-convert a first modulated signal having a first bandwidth centered about the first frequency to baseband components centered about zero Hertz (Hz), and to down-convert a second modulated signal having a sec- ond bandwidth centered about a second frequency to a relatively low intermediate frequency (IF);

an analog-to-digital converter (ADC) to digitize outputs of the receive tuner; and digital baseband processor including a multi-mode digital demodulator to demodulate data output from the ADC within a bandwidth that encompasses the first and second bandwidths, wherein the demodulator is digitally controllable to operate at zero Hz with respect to the first signal, and to operate at the intermediate frequency with respect to the second signal.

2. The system of claim 1, wherein the first bandwidth encompasses the second bandwidth, and wherein the digital baseband processor further includes:

a digital baseband module calibrated with respect to one or more of the first frequency and the first bandwidth to process baseband components of the first and second signals.

3. The system of claim 2, wherein the digital baseband module includes:

a digital IQ imbalance compensation module, calibrated with respect to the first frequency, to apply corresponding compensation parameters to baseband components of the first and second signals.

4. The system of claim 2, wherein:

the first bandwidth is at least twice the second bandwidth; and the second bandwidth is at least twice an offset between the first and second frequencies.

5. The system of claim 1, wherein:

the receive tuner includes in-phase and quadrature phase (I and Q) single-stage frequency down-converters and corresponding I and Q baseband filters; and the digital demodulator is configured to demodulate orthogonal frequency division multiplex (OFDM) data.

6. The system of claim 5, wherein:

the frequency down-converters are tuned to a frequency within a range of approximately 1125 MHz to 1675 MHz;

the baseband filters have a bandwidth of at least −50 MHz to 50 MHz;

the baseband demodulator is configured to demodulate OFDM data within a bandwidth of at least 100 MHz.

7. The system of claim 6, wherein the digital baseband processor further includes:

a digital IQ imbalance compensation module, calibrated to compensate frequency dependent IQ imbalance associated with the baseband filters at the first frequency and to compensate frequency independent IQ imbalance associated with the frequency down-converters, and to apply corresponding compensation parameters to baseband components of the first and second signals.

8. The system of claim 1, wherein the digital demodulator is configured to perform single sideband demodulation at least with respect to the second signal.

9. The system of claim 1, wherein the digital baseband processor further includes a multi-mode digital modulator, digitally controllable to modulate data in a selected one of first and second modes, wherein the first mode corresponds to a first bandwidth centered about zero Hz and the second mode corresponds to a second bandwidth centered about a relatively low intermediate frequency (IF), the system further including:

a digital-to-analog converter (DAC) coupled to outputs of the digital modulator; and a transmit tuner, tuned with respect to the first frequency, to receive outputs of the DAC.

10. The system of claim 9, wherein the digital modulator is configured to perform single sideband modulation at least with respect to the intermediate frequency.

* * * * *